(12) United States Patent
Corson

(10) Patent No.: US 11,627,418 B1
(45) Date of Patent: Apr. 11, 2023

(54) MULTILAYER MEMBRANES FOR HAPTIC DEVICES

(71) Applicant: META PLATFORMS TECHNOLOGIES, LLC, Menlo Park, CA (US)

(72) Inventor: Nicholas Roy Corson, Woodinville, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 963 days.

(21) Appl. No.: 16/299,738

(22) Filed: Mar. 12, 2019

(51) Int. Cl.
*H04R 23/00* (2006.01)
*F15C 1/04* (2006.01)
*G08B 6/00* (2006.01)

(52) U.S. Cl.
CPC ............... *H04R 23/00* (2013.01); *F15C 1/04* (2013.01); *G08B 6/00* (2013.01); *H04R 2400/03* (2013.01)

(58) Field of Classification Search
CPC ....................... G09B 21/001–008; G06F 3/016
See application file for complete search history.

(56) References Cited

U.S. PATENT DOCUMENTS

| | | | | |
|---|---|---|---|---|
| 2012/0105333 | A1* | 5/2012 | Maschmeyer | G06F 3/016 345/173 |
| 2013/0044049 | A1* | 2/2013 | Biggs | H01L 41/0986 345/156 |
| 2016/0187985 | A1* | 6/2016 | Lim | H01L 41/193 345/173 |
| 2019/0020288 | A1* | 1/2019 | Mäkinen | H02N 1/004 |

* cited by examiner

*Primary Examiner* — Walter F Briney, III
(74) *Attorney, Agent, or Firm* — Greenberg Traurig, LLP

(57) ABSTRACT

The disclosed device may include a first layer of fluidic transducers and a second layer of fluidic transducers. Each transducer in the first layer may include a first electrode coupled to a first substrate of the first layer, a second electrode coupled to a second substrate of the first layer, and a fluid channel between the first and second electrodes of the first layer. Each transducer in the second layer may include a first electrode coupled to a first substrate of the second layer, a second electrode coupled to a second substrate of the second layer, and a fluid channel between the first and second electrodes of the second layer. The second layer of fluidic transducers may be positioned on the first layer of fluidic transducers. Various other methods, systems, and computer-readable media are also disclosed.

20 Claims, 16 Drawing Sheets

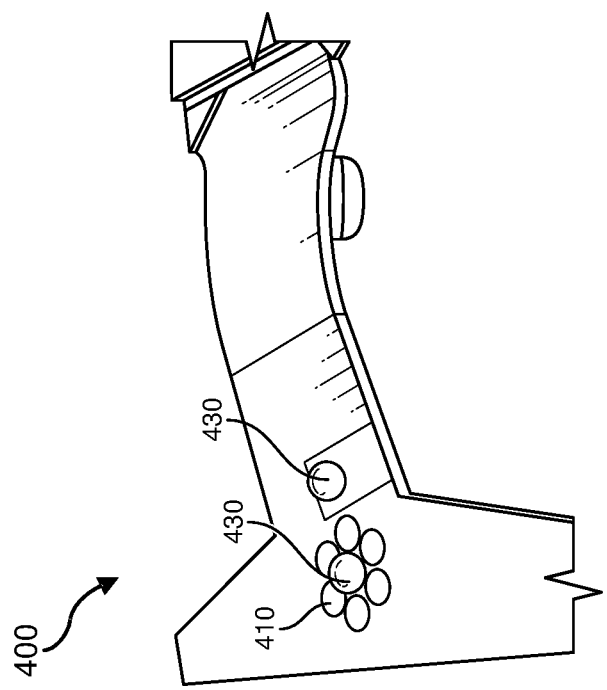
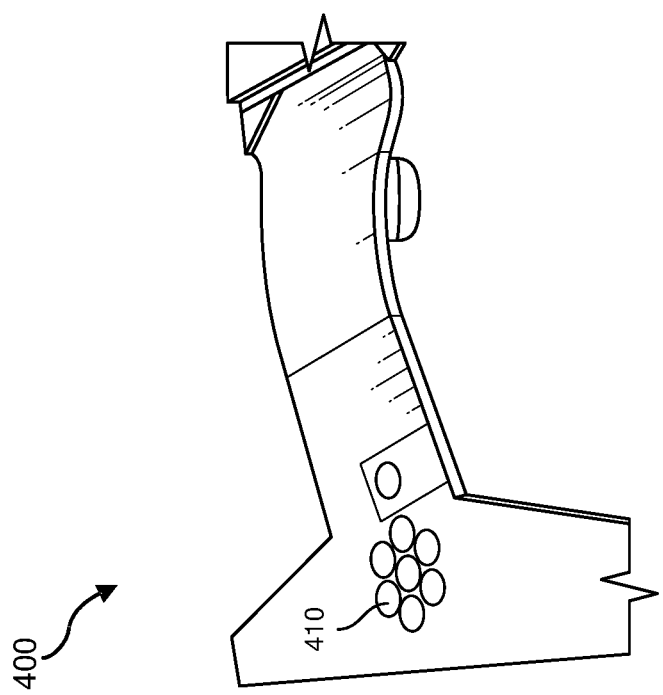

MULTILAYER MEMBRANES FOR HAPTIC DEVICES

BACKGROUND

Virtual reality (VR), augmented reality, and other artificial reality systems may enable users to experience events in computer-generated simulations which may superimpose on or replace a real-world view. Artificial reality systems often utilize headsets or eyewear devices to provide visual feedback and headphones or speakers to provide audio feedback. Thus, users may experience artificial reality through vision and hearing.

To further enhance users' immersion into the artificial reality experience, artificial reality systems may include haptic displays or devices, such as gloves or other wearable devices. Haptic devices may provide haptic or tactile feedback to users such that users experience simulated touch sensations. For instance, users may feel textures of surfaces of virtual objects, resistance against virtual objects, or may feel vibrations of virtual objects. Haptic devices may be made of electroactive polymer materials which may change their shape under the influence of an electric field. The touchable surface of a haptic feedback device may include an electroactive polymer layer which may be manipulated by applying an electrical current to deform the layer in accordance with a desired tactile sensation. However, the electroactive polymer layer may be limited to a single actuation resolution which may restrict the haptic capabilities of the haptic feedback device.

SUMMARY

As will be described in greater detail below, the instant disclosure describes a multilayer membrane capable of multiple actuation resolutions for haptic feedback. Each layer of the multilayer membrane may include fluidic transducers which may use fluidic pressure to selectively deform portions of the multilayer membrane to produce haptic feedback.

In one example, a device may include a first layer of deformable fluidic transducers, wherein each transducer in the first layer comprises: a first electrode coupled to a first substrate of the first layer; a second electrode coupled to a second substrate of the first layer; and a fluid channel between the first and second electrodes of the first layer; and a second layer of deformable fluidic transducers, wherein each transducer in the second layer comprises: a first electrode coupled to a first substrate of the second layer; a second electrode coupled to a second substrate of the second layer; and a fluid channel between the first and second electrodes of the second layer; wherein the second layer of fluidic transducers is positioned on the first layer of fluidic transducers.

In some examples, the first and second electrodes of the first transducer may be positioned such that applying a first electric potential to at least one of the first and second electrodes of a first transducer to actuate the first transducer may generate a first attractive force between the first and second electrodes of the first transducer. The first and second electrodes of the actuated first transducer may be configured to, in response to the first attractive force, compress the fluid channel of the actuated first transducer to push out a fluid from the fluid channel and may deform an unactuated transducer by the fluid.

In some examples, the second layer of fluidic transducers may be positioned on the first layer of fluidic transducers such that deformation of transducers of the first layer of fluidic transducers causes deformation of transducers of the second layer of fluidic transducers.

In some examples, the first layer of fluidic transducers may comprise a first open-celled structure defining a shape of the transducers of the first layer and the second layer of fluidic transducers may comprise a second open-celled structure defining a shape of the transducers of the second layer.

In some examples, the first open-celled structure may differ from the second open-celled structure in at least one of cell dimension, cell shape, or wall thickness. In some examples, the first open-celled structure may be offset from the second open-celled structure such that walls of the first open-celled structure may not be aligned with walls of the second open-celled structure.

In some examples, the first layer of fluidic transducers may be capable of a first actuation resolution, the second layer of fluidic transducers may be capable of a second actuation resolution different from the first actuation resolution, and simultaneous actuation of the first and second actuation layers may produce a third actuation resolution.

In some examples, the device may further comprise a fluidic controller coupled to the channels of the first and second layers. The fluidic controller may be configured to selectively apply fluidic pressure to one or more transducers of the first and second layers.

In some examples, one of the first and second substrates of the first layer of fluidic transducers may be integrated with one of the first and second substrates of the second layer of fluidic transducers.

In some examples, at least one of the first or second layers of fluidic transducers may be configured to provide haptic feedback for an artificial reality system. In some examples, the first and second layers of fluidic transducers may be integrated in a wearable device. In some examples, at least one of the first and second layers of fluidic transducers may comprise a capacitive pressure sensor.

In addition, a corresponding method for fabricating the above-described device may include (1) forming a first conductive layer on a first substrate, (2) forming a second conductive layer on a second substrate, and (3) at least partially bonding the first substrate to the second substrate to form a first layer of deformable fluidic transducers. The unbonded portions of the first substrate and the second substrate may define a first fluid channel between the first conductive layer and the second conductive layer. The method may include (4) inserting a first fluid in the first fluid channel between the first conductive layer and the second conductive layer, (5) forming a third conductive layer on a third substrate, (6) forming a fourth conductive layer on a fourth substrate, and (7) at least partially bonding the third substrate to the fourth substrate to form a second layer of deformable fluidic transducers. The unbonded portions of the third substrate and the fourth substrate may define a second fluid channel between the third conductive layer and the fourth conductive layer. The method may also include (8) inserting a second fluid in the second fluid channel between the third conductive layer and the fourth conductive layer. The second layer of fluidic transducers may be positioned on the first layer of fluidic transducers.

In some examples, the method may further comprise selectively applying fluidic pressure, using the first or second fluid, to one or more transducers of the first and second layers of fluidic transducers. In some examples, the method may further comprise forming a surface of a wearable device using at least one of the first and second layers of fluidic transducers.

In some examples, a corresponding method of using the above-described device may include applying an electric potential to at least one transducer of a first layer of deformable fluidic transducers or a second layer of deformable fluidic transducers of a device to produce a target actuation resolution. Each transducer in the first layer of fluidic transducers may comprise a first electrode coupled to a first substrate of the first layer, a second electrode coupled to a second substrate of the first layer, and a fluid channel between the first and second electrodes of the first layer of electrodes. Each transducer in the second layer of fluidic transducers may comprise a first electrode coupled to a first substrate of the second layer, a second electrode coupled to a second substrate of the second layer, and a fluid channel between the first and second electrodes of the second layer. The second layer of fluidic transducers may be positioned on the first layer of fluidic transducers.

In some examples, the device may comprise a haptic feedback device for an artificial reality system. Applying the electric potential may further include (a) determining the target actuation resolution based on haptic feedback for the artificial reality system, the target actuation resolution comprising a first actuation resolution for the first layer of fluidic transducers and a second actuation resolution for the second layer of fluidic transducers, (b) determining, based at least on the first actuation resolution, a first electric potential to be applied to the first layer of fluidic transducers, (c) determining, based at least on the second actuation resolution, a second electric potential to be applied to the second layer of fluidic transducers, and (d) actuating a first transducer of the first layer of fluidic transducers by applying the first electric potential to the first and second electrodes of the first transducer. Actuating the first transducer may generate a first attractive force between the first and second electrodes of the actuated first transducer, may compress the fluid channel between the first and second electrodes, may cause a first fluid in the fluid channel to deform an unactuated transducer of the first layer of fluidic transducers, and may produce the first actuation resolution. The method may also include (e) actuating a second transducer of the second layer of fluidic transducers by applying the second electric potential to the second transducer. Actuating the second transducer may generate a second attractive force between the first and second electrodes of the actuated second transducer, may compress the fluid channel between the first and second electrodes of the second transducer, may cause a second fluid in the fluid channel to deform an unactuated transducer of the second layer of fluidic transducers, and may produce the second actuation resolution.

In some examples, deforming the unactuated transducer of the first or second layer of fluidic transducers may include inflating or straining a substrate of the unactuated transducer using the first or second fluid.

In some examples, the method may further include preloading the transducers of the first or second layer of fluidic transducers by selectively applying fluidic pressure, using the first or second fluid, to one or more transducers.

In some examples, the method may further include determining a pulse frequency corresponding to the target actuation resolution. The target actuation resolution may correspond to a vibration intensity. The method may further include applying fluid pressure to unactuated transducers of the first or second layer of fluidic transducers. The method may further include pulsing actuation of the transducers of the first or second layers based on the pulse frequency. The pulsing actuation of the nodes may produce the vibration intensity.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 4A-4E are diagrams of multi-layer arrangements of fluidic transducers, according to embodiments of this disclosure.

Figure 1:
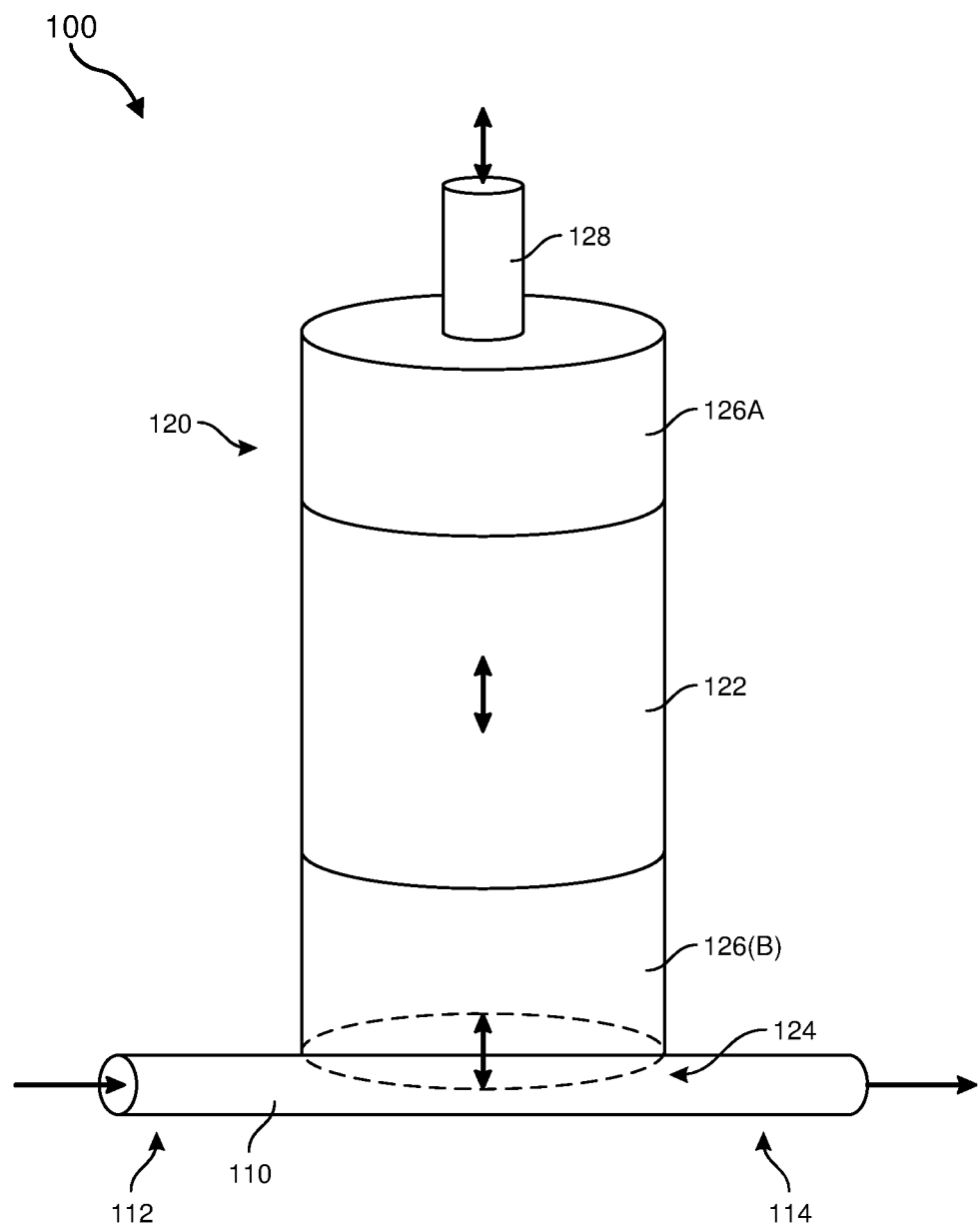
FIG. 1 is a schematic diagram of a fluidic transducer, according to embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a multi-layer membrane. As will be explained in greater detail below, embodiments of the instant disclosure may include at least first and second layers of fluidic transducers. The transducers may each include a pair of electrodes having a fluid therebetween. Applying an electric potential to the electrodes may push the fluid out from between the electrodes to deform the membrane. The multiple layers may each be capable of different actuation resolutions.

Embodiments of the present disclosure may provide a number of features and advantages over traditional haptic devices. Traditional haptic feedback materials for haptic devices may be limited in actuation resolution or otherwise may be prohibitively sized for wearable devices such as gloves. Actuation resolution may include or refer to a density and/or size of actuatable elements which may correspond to a density and/or magnitude of surface deformations. Although bulky haptic gloves may produce multiple actuation resolutions, the bulky size and weight may be uncomfortable for users to wear. Embodiments of the present disclosure may provide an electroactive membrane which may be capable of producing multiple actuation resolutions in a space efficient form that may be suitable for wearable devices. The space efficient form may also allow additional applications, such as tabletops or other device surfaces which may not accommodate traditional haptic feedback devices.

Figure 2A:
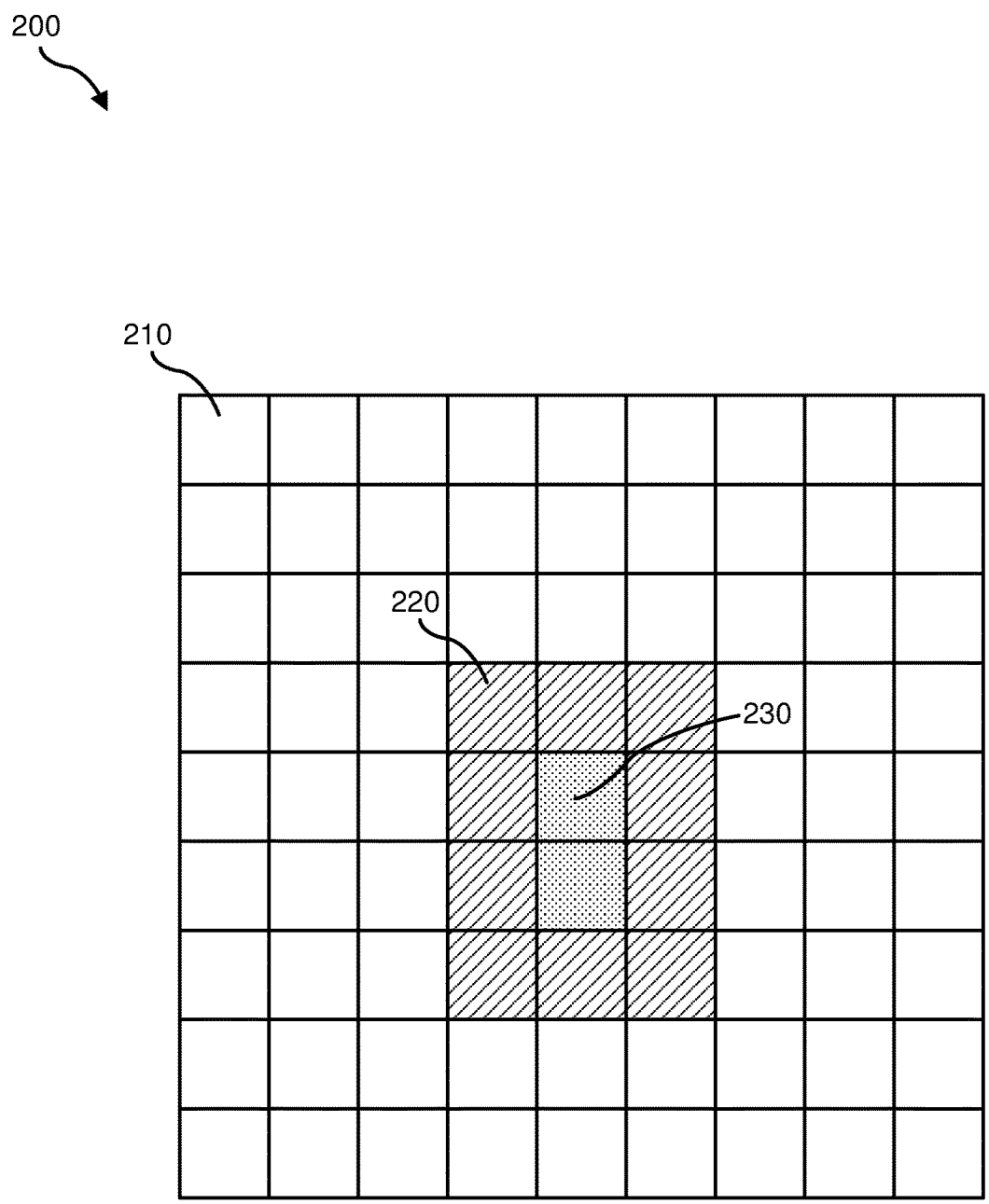
FIGS. 2A-2C are diagrams of an exemplary layer of fluidic transducers, according to embodiments of this disclosure.
Figure 2B:
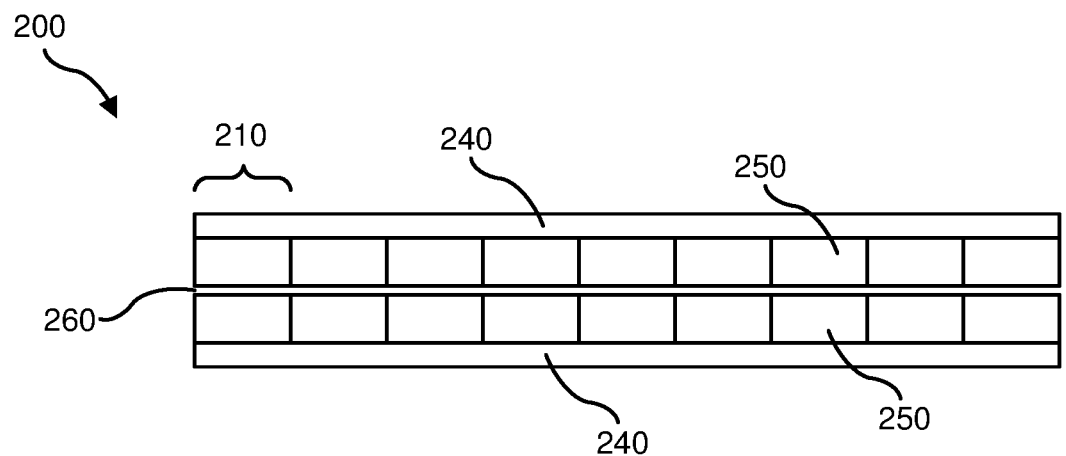
Figure 2C:
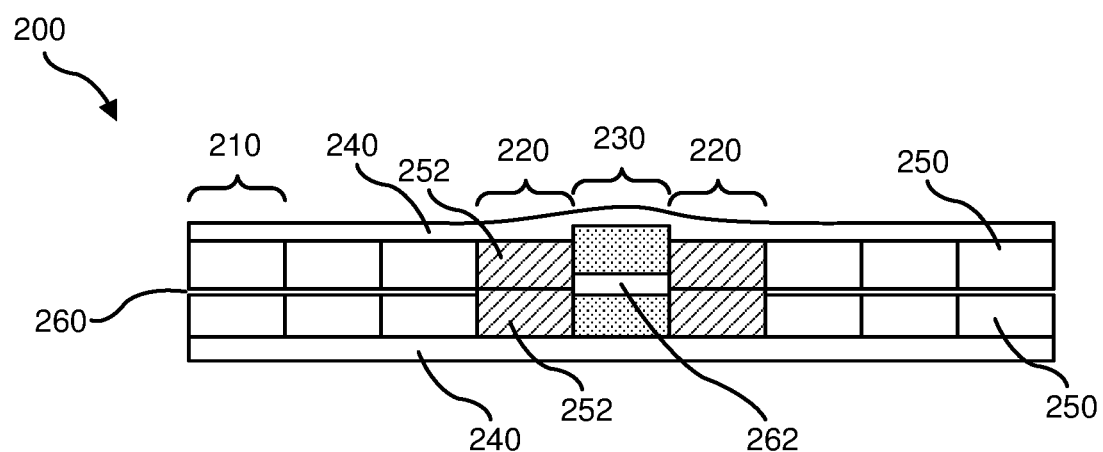
Figure 3A:
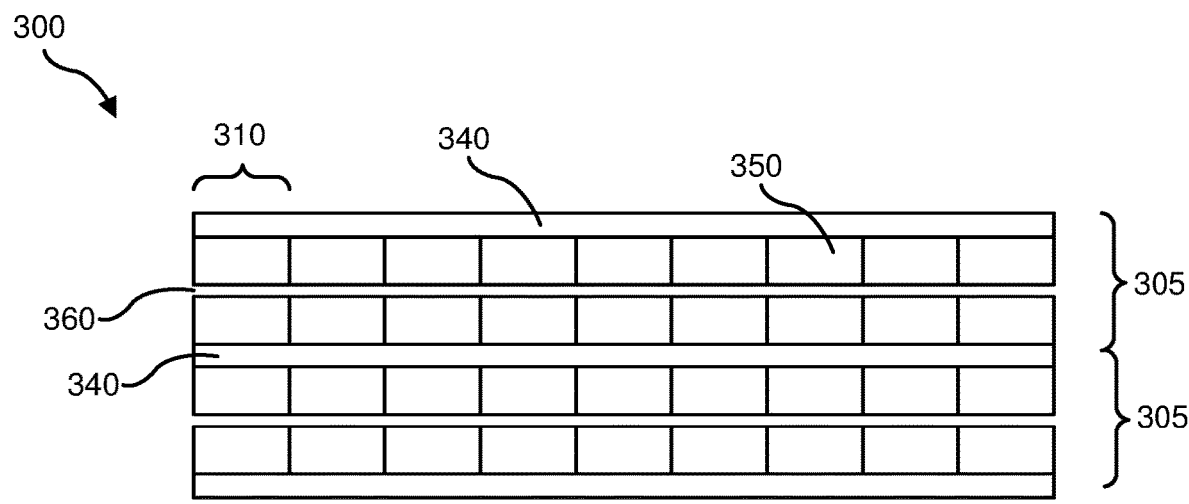
FIGS. 3A-3B are diagrams of exemplary multiple layers of fluidic transducers, according to embodiments of this disclosure.
Figure 3B:
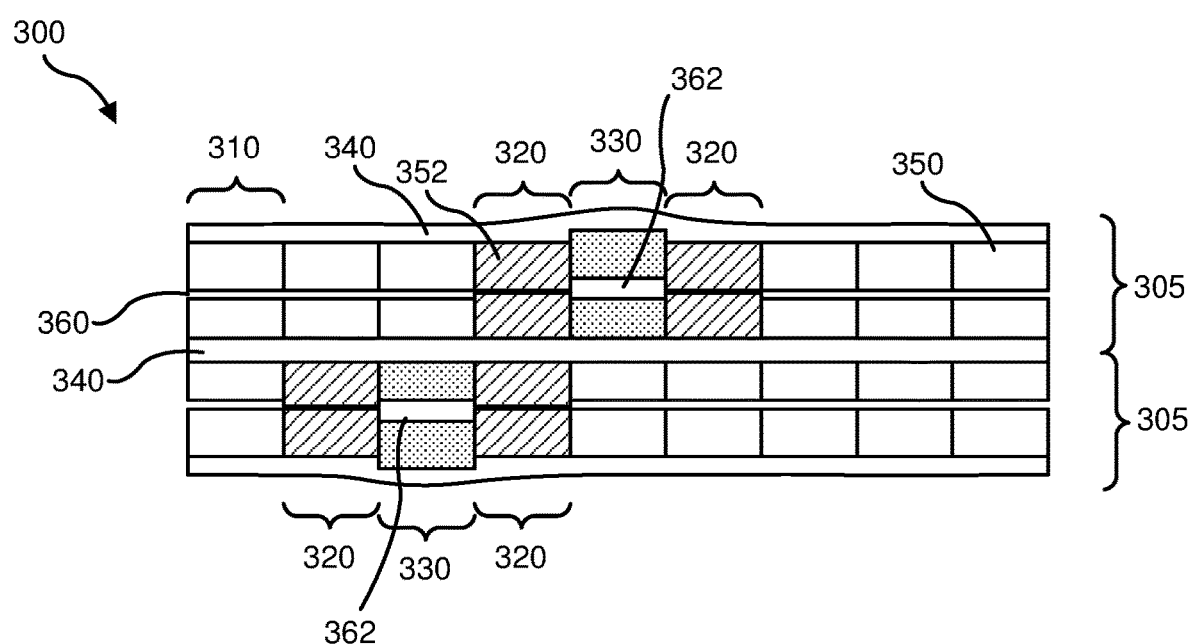
Figure 5A:
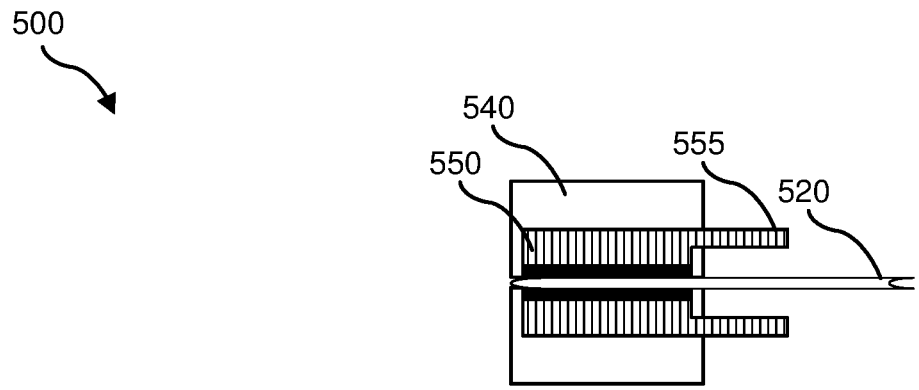
FIGS. 5A-5C are diagrams of fabrication layers, according to embodiments of this disclosure.
Figure 5B:
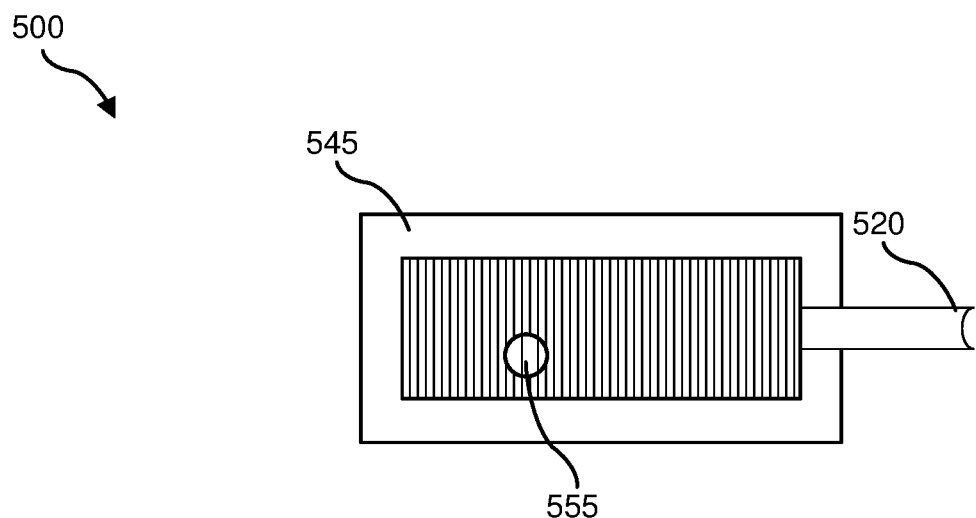
Figure 5C:
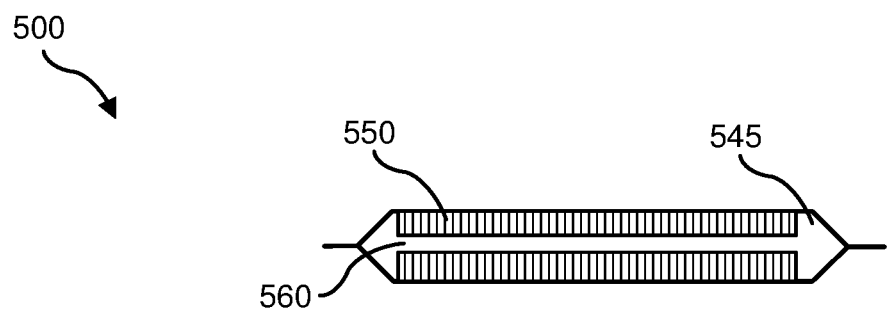
Figure 6:
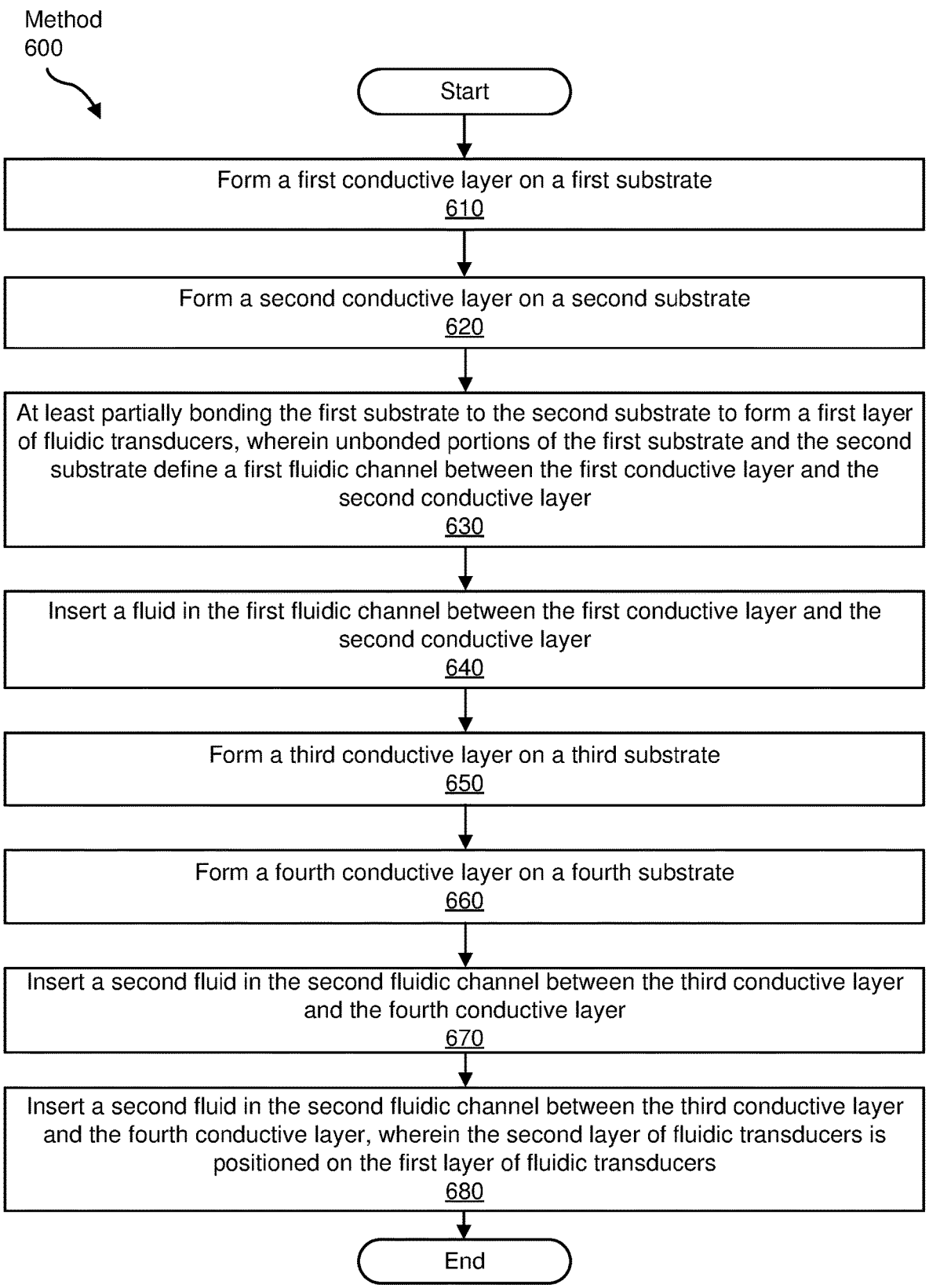
FIG. 6 is a flowchart of an exemplary method for fabricating layers of fluidic transducers, according to embodiments of this disclosure.
Figure 7:
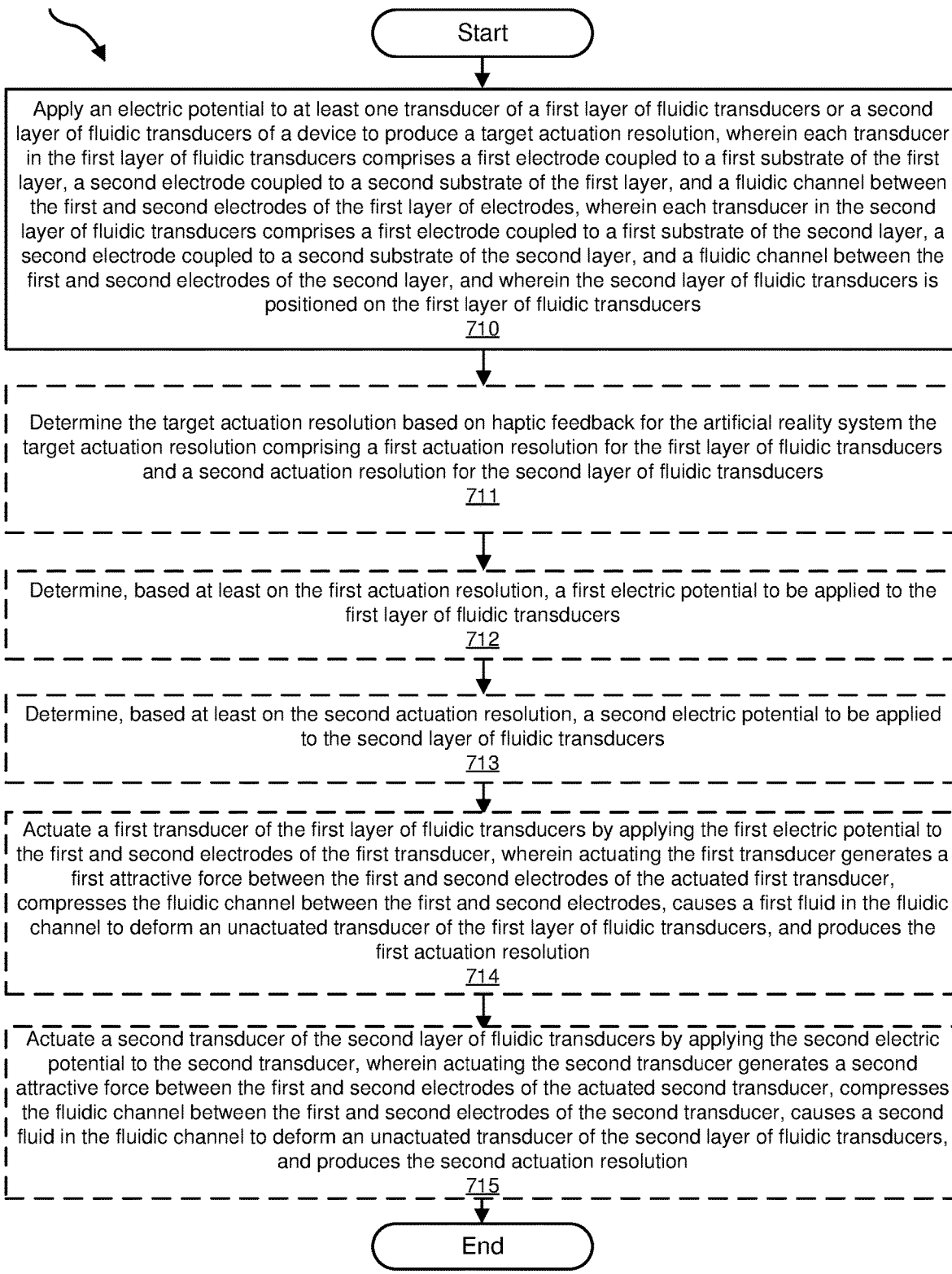
FIG. 7 is a flowchart of an exemplary method of using a device with fluidic transducers, according to embodiments of this disclosure.
Figure 8:
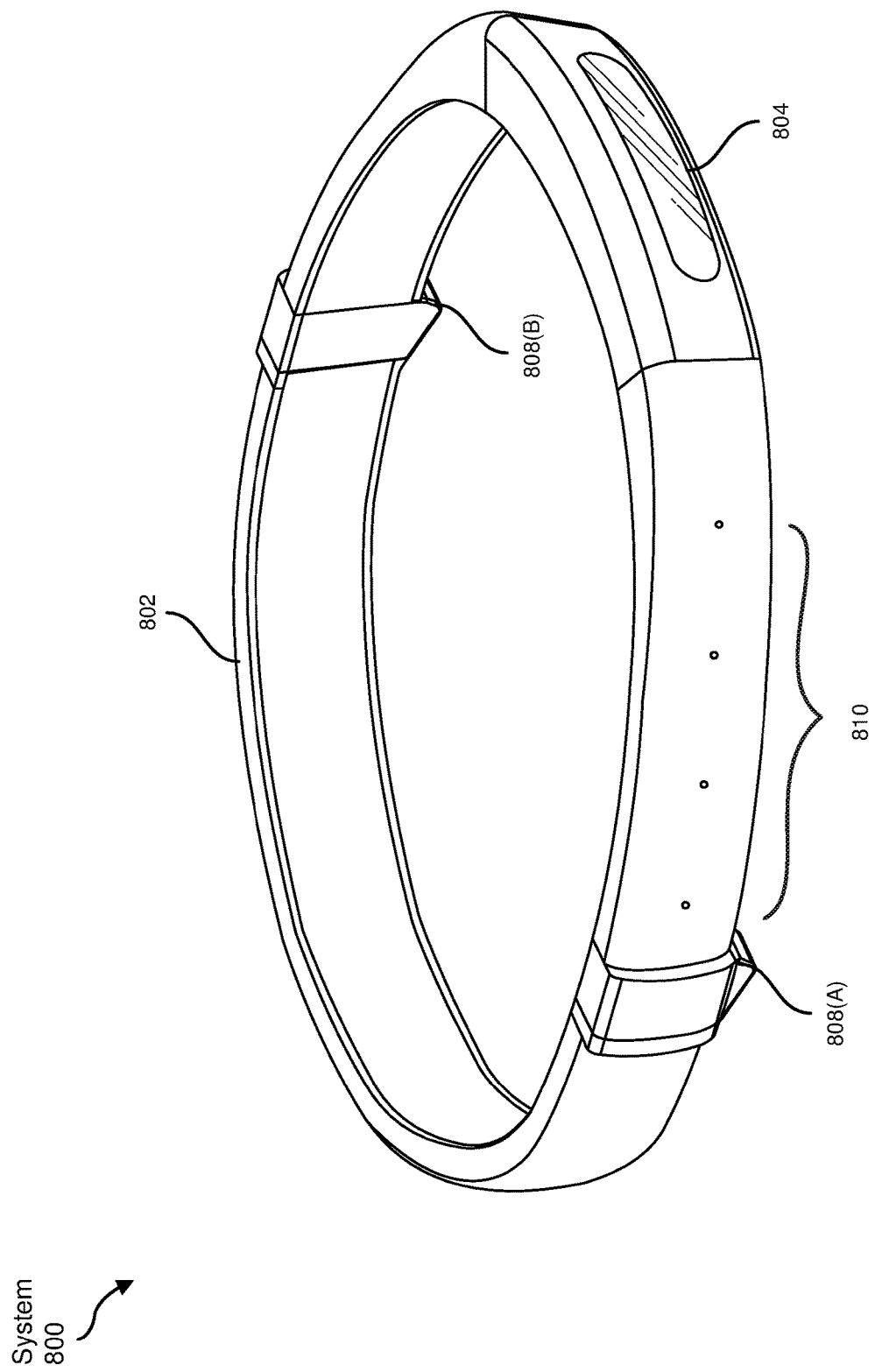
FIG. 8 is a diagram of an example artificial-reality headband according to embodiments of this disclosure.
Figure 9:
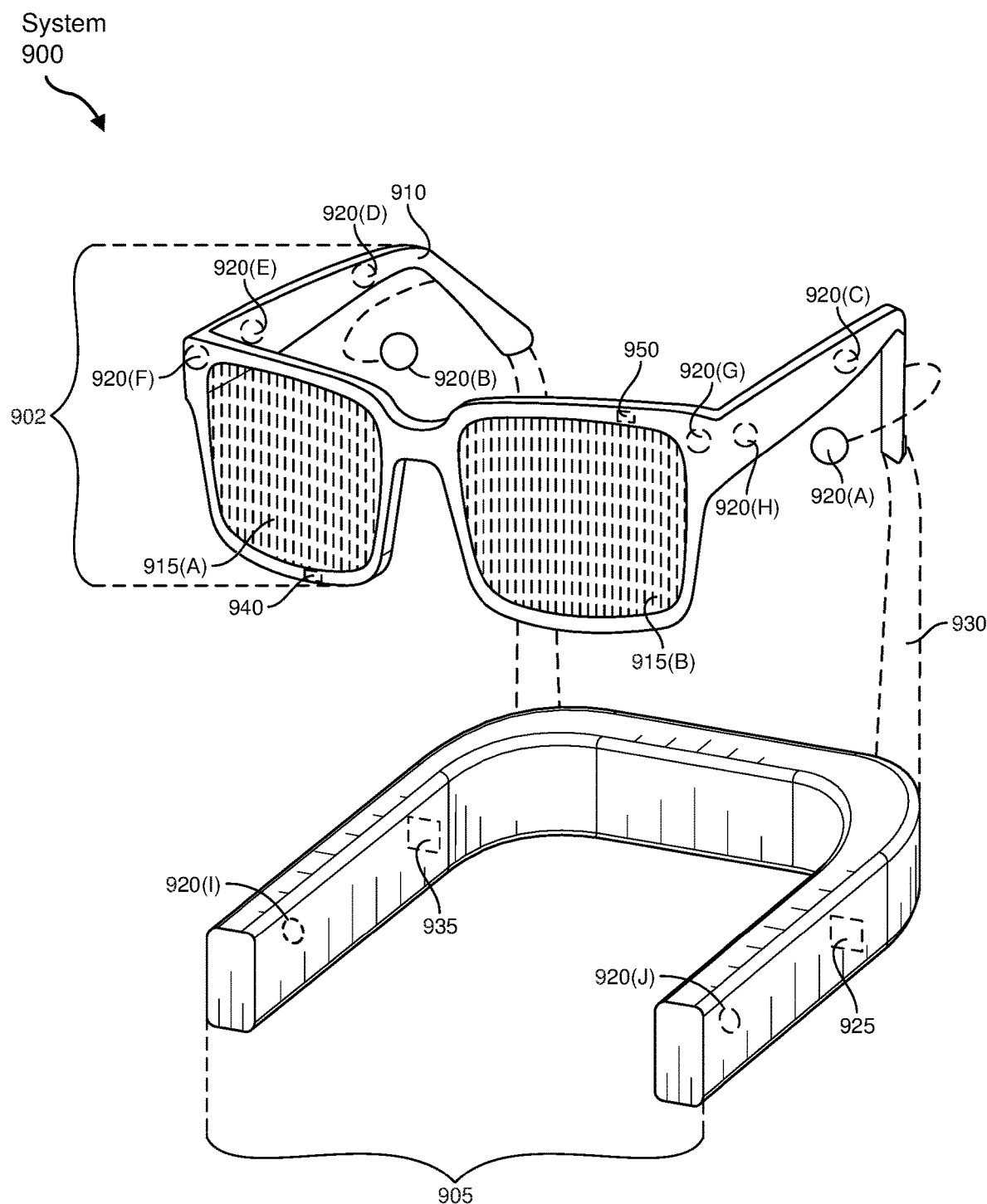
FIG. 9 is a diagram an example of augmented-reality glasses according to embodiments of this disclosure.
Figure 10:
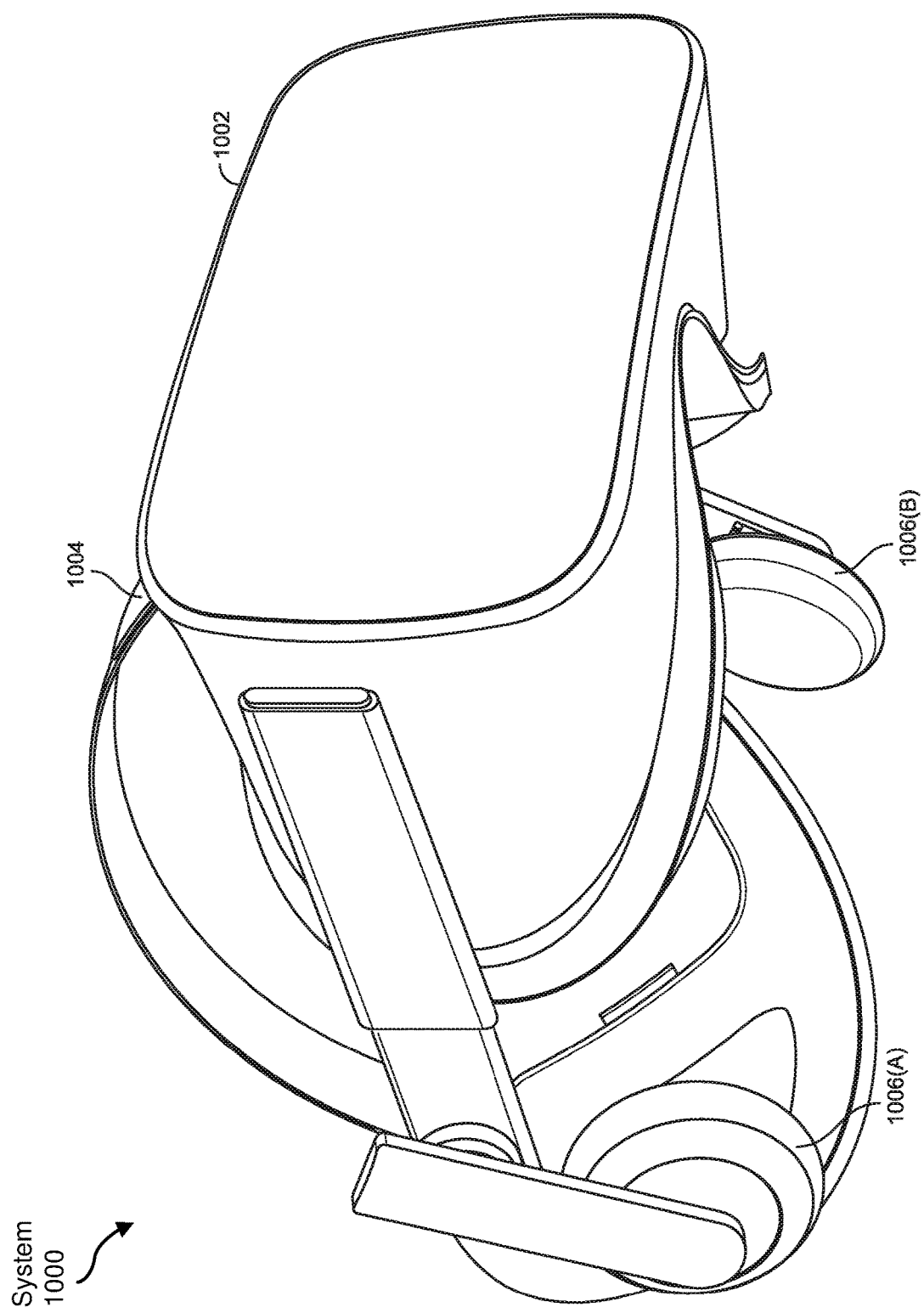
FIG. 10 is a diagram of an example of a virtual-reality headset according to embodiments of this disclosure.
Figure 11:
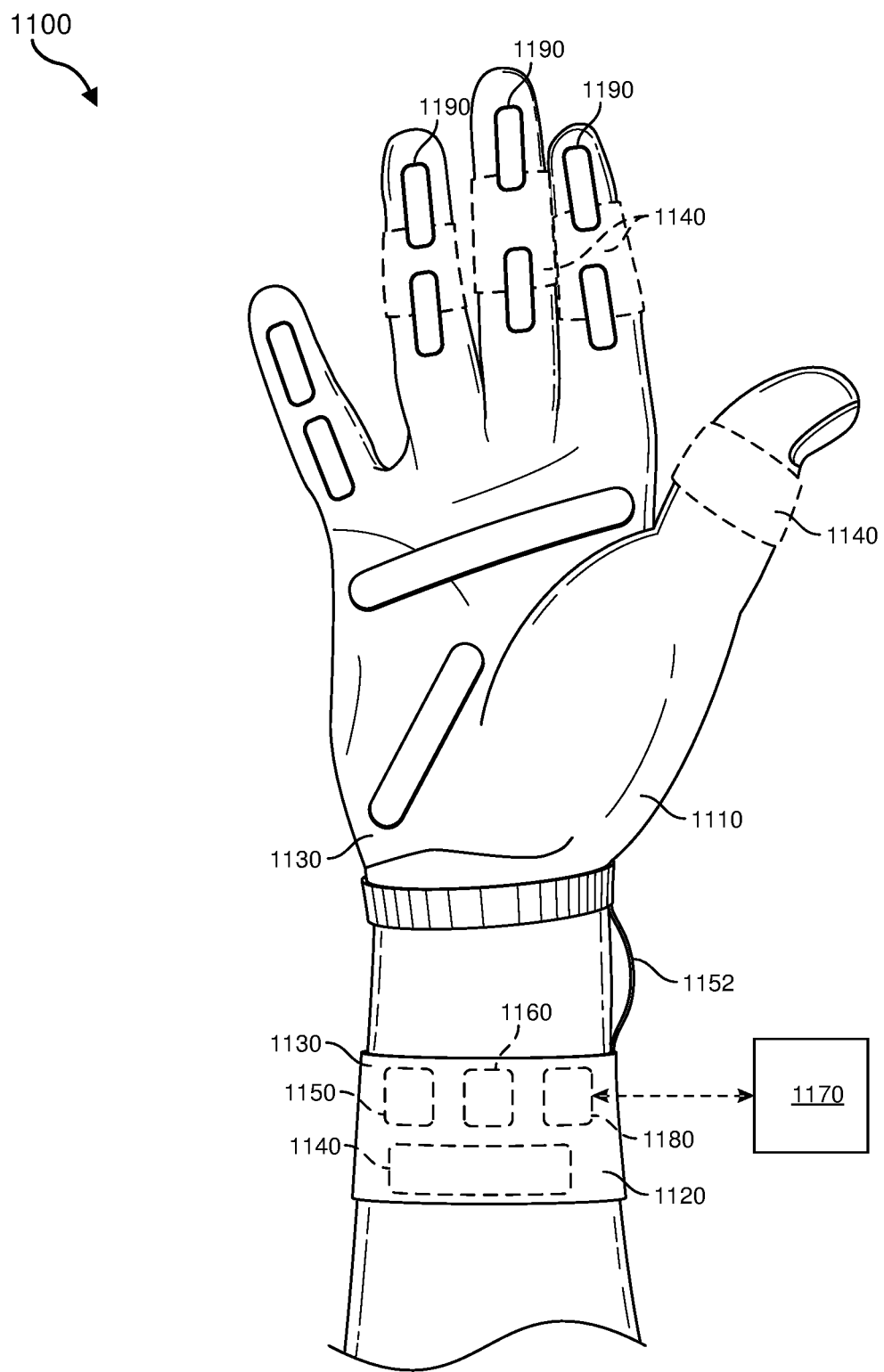
FIG. 11 is a diagram of example haptic devices according to embodiments of this disclosure.
Figure 12:
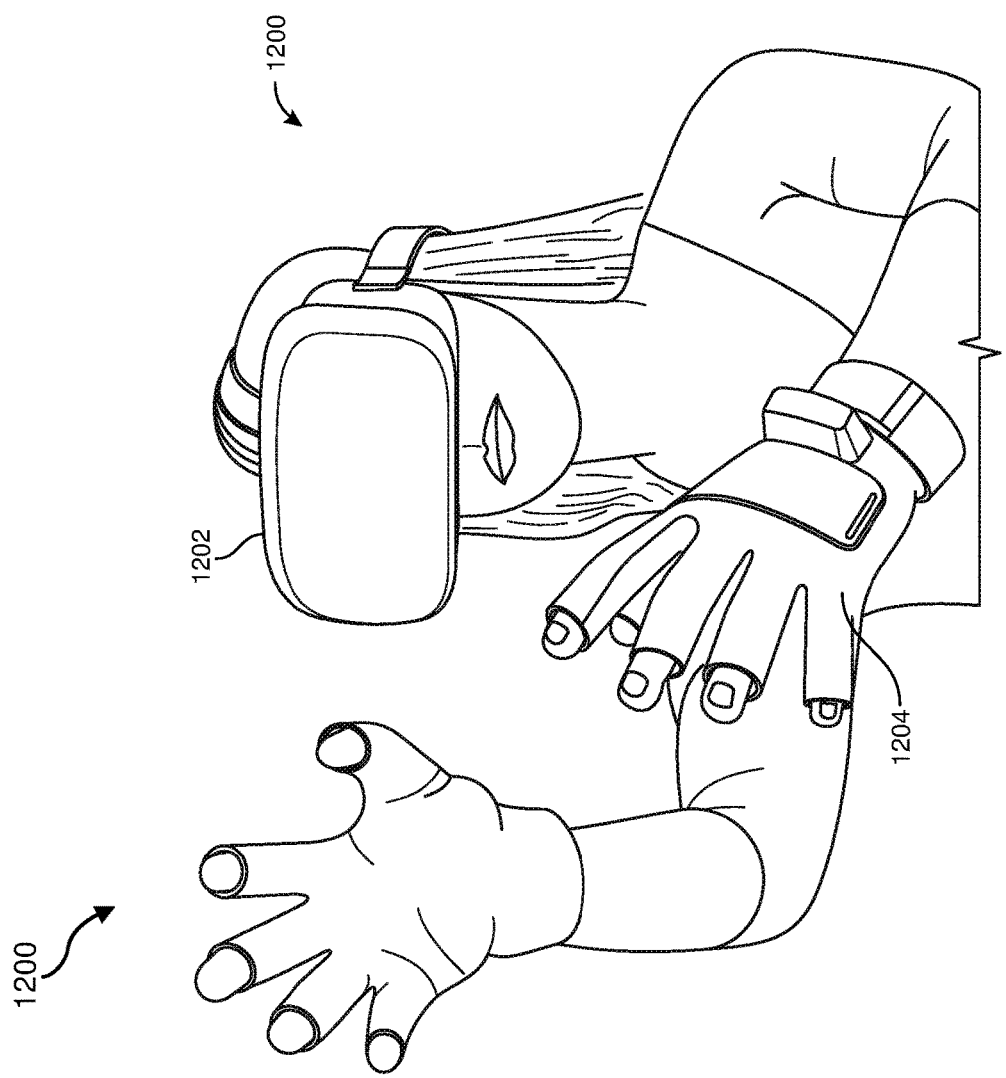
FIG. 12 is a diagram of an example virtual-reality environment according to embodiments of this disclosure.
Figure 13:
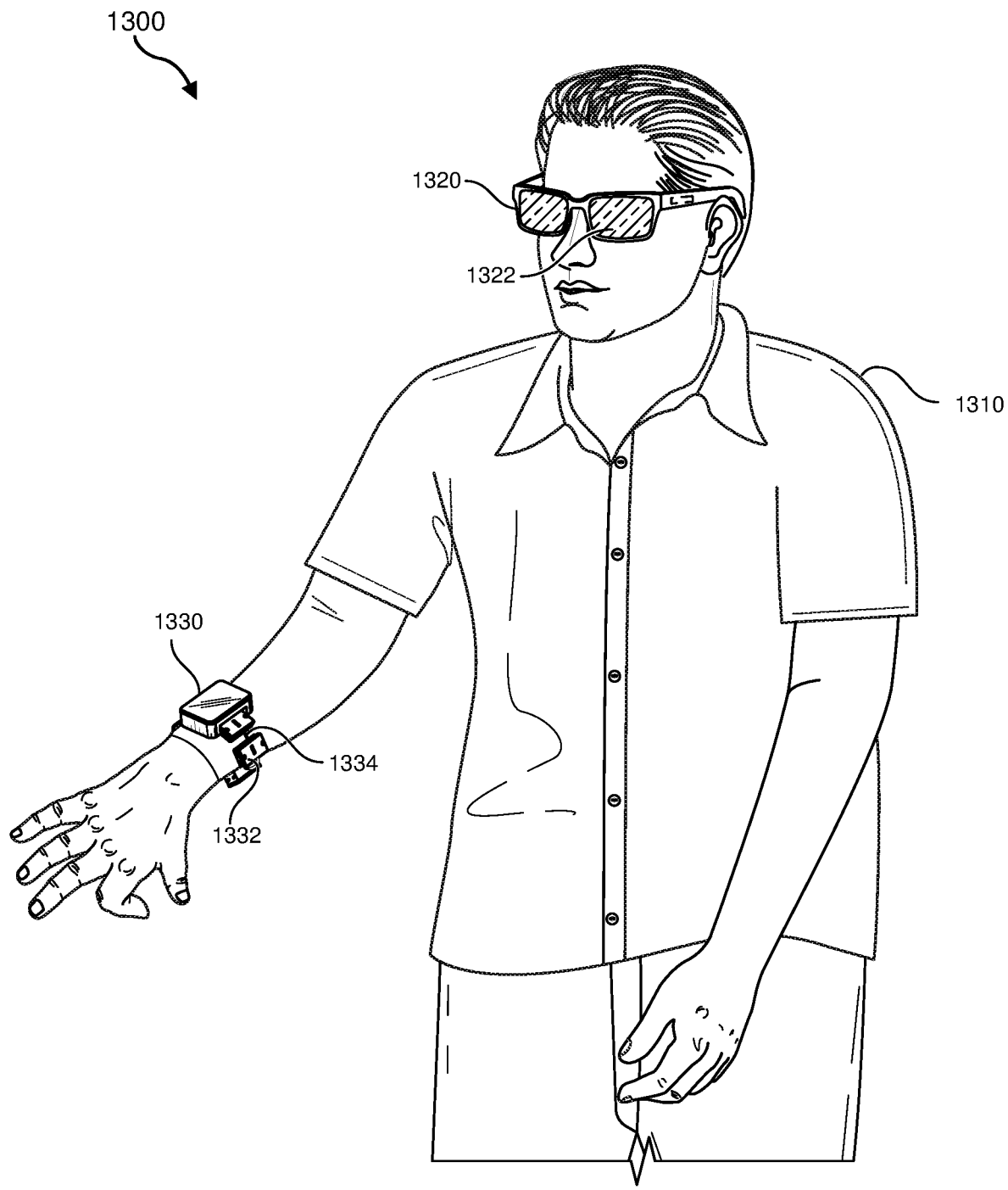
FIG. 13 is a diagram of an example augmented-reality environment according to embodiments of this disclosure.

The following will provide, with reference to FIGS. 1-13, detailed descriptions of a multilayer membrane. FIG. 1 illustrates an example fluidic transducer. FIGS. 2A-2C illustrate top-down and cross-sectional views of a layer of fluidic transducers. FIGS. 3A-3B illustrate cross-sectional views of a multilayer membrane. FIGS. 4A-4E illustrate cross-sectional views of other embodiments of a multilayer membrane. FIGS. 5A-5C illustrate cross-sectional and top-down views of fabrication steps of a layer of fluidic transducers. FIG. 6 illustrates an exemplary process of fabricating a multilayer membrane. FIG. 7 illustrates an exemplary process of using a multilayer membrane. FIG. 8 illustrates an exemplary artificial-reality headband. FIG. 9 illustrates an exemplary augmented-reality glasses device. FIG. 10 illustrates an exemplary virtual-reality headset. FIG. 11 illustrates an exemplary haptic device. FIG. 12 illustrates an exemplary virtual-reality environment. FIG. 13 illustrates an exemplary augmented-reality environment.

The present disclosure may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

The present disclosure may include haptic fluidic systems that involve the control (e.g., stopping, starting, restricting, increasing, etc.) of fluid flow through a fluid channel. The control of fluid flow may be accomplished with a fluidic transducer. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

Fluidic valve 100 may include a gate 120 for controlling the fluid flow through fluid channel 110. Gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to gate transmission element 122 may result in opening restricting region 124 to allow or increase flow through the fluid channel 110. The force, pressure, or displacement applied to gate transmission element 122 may be referred to as a gate force, gate pressure, or gate displacement. Gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, gate 120 of fluidic valve 100 may include one or more gate terminals, such as an input gate terminal 126A and an output gate terminal 126B (collectively referred to herein as "gate terminals 126") on opposing sides of gate transmission element 122. Gate terminals 126 may be elements for applying a force (e.g., pressure) to gate transmission element 122. By way of example, gate terminals 126 may each be or include a fluid chamber adjacent to gate transmission element 122. Alternatively or additionally, one or more of gate terminals 126 may include a solid component, such as a lever, screw, or piston, that is configured to apply a force to gate transmission element 122.

In some examples, a gate port 128 may be in fluid communication with input gate terminal 126A for applying a positive or negative fluid pressure within the input gate terminal 126A. A control fluid source (e.g., a pressurized fluid source, a fluid pump, etc.) may be in fluid communication with gate port 126 to selectively pressurize and/or depressurize input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward restricting region 124, resulting in a corresponding pressurization of output gate terminal 126B. Pressurization of output gate terminal 126B may, in turn, cause restricting region 124 to partially or fully restrict to reduce or stop fluid flow through the fluid channel 110. Depressurization of input gate terminal 126A may cause gate transmission element 122 to be displaced away from restricting region 124, resulting in a corresponding depressurization of the output gate terminal 114B. Depressurization of output gate terminal 126B may, in turn, cause restricting region 124 to partially or fully expand to allow or increase fluid flow through fluid channel 110. Thus, gate 120 of fluidic valve 100 may be used to control fluid flow from inlet port 112 to outlet port 114 of fluid channel 110.

FIGS. 2A-2C illustrate various views of a layer 200 having multiple deformable fluidic valves or transducers 210. FIG. 2A presents a top-down view of layer 200. FIGS. 2B-2C present side views of layer 200. In FIG. 2A, layer 200 includes a plurality of transducers 210 which may be arranged in a grid-like arrangement, although in other embodiments transducers 210 may be arranged in alternative arrangements. Each transducer 210 may correspond to fluidic valve 100. Fluidic transducers may include actuatable elements which when actuated causes a change in fluidic pressure, for instance by restricting and/or allowing fluid flow through a fluid channel of the fluidic transducer. The fluidic transducers may be deformable such that one or more components of the fluidic transducers may deform, for example in response to changes in fluid pressure, actuation, etc.

As illustrated in FIG. 2B, each transducer 210 may include a pair of electrodes 250 connected to substrates 240. Each electrode 250 may be paired with another electrode 250. For example, each electrode 250 connected to a top substrate 240 may have a corresponding mate electrode 2140 connected to a bottom substrate 240. Although in FIGS. 2A-2C show electrodes 250 arranged in pairs for each transducer 210, in other embodiments more electrodes 250 may be mated for each transducer 210. Each electrode 250 pair may correspond to gate 108, and each electrode 250 may correspond to gate transmission element 110. A gap may be present between mated electrodes 250 for a transducer 210. The gap may define a fluid channel 260 between electrodes 250. Fluid channel 260 may be filled with a fluid, such as a gas or a liquid. Examples of fluid may include, for example, air, nitrogen, water, etc. Fluid channel 260 may correspond to fluid channel 102.

Electrodes 250 may be made of a conductive material or materials, such as carbon nanotubes (CNT) in conjunction with another material such as carbon doped polymers, carbon doped silicone, etc. Electrodes 250 may be capacitive or otherwise electro-adhesive such that when an electric potential is applied to at least one of a pair of electrodes 250, an attractive force (e.g., electromagnetic force) between the pair of electrodes 250 may be generated. Thus, actuating each transducer 210 may cause its electrodes 250 to adhere, partially or fully reducing or stopping fluid flow through fluid channel 260 similar to gate transmission element 110 restricting fluid flow through fluid channel 102. The control of fluid flow may selectively control deformation of layer 200, for instance as part of a haptic display. The control of fluid flow may, in some examples, define flow paths through layer 200 which may be used for redirecting and/or restricting fluid flow or create flow paths to/from other valves and/or devices.

Substrates 240 may be made of a non-rigid material, such as elastomer, thermoplastic polyurethane (TPU), silicone, etc. When the attractive force acts on electrodes 250, electrodes 250 may be able to come together and adhere together or nearly together without being significantly resisted by substrates 240.

Fluid channel 260 may be an empty space between opposing electrodes 250. Although the cross-sectional views in FIGS. 2B and 2C show fluid channel 260 as a single channel, fluid channel 260 may include various interconnected chambers or cells which may correspond to transducers 210. For example, fluid channel 260 may have an open-celled structure, in which a cell structure defined by walls is repeated. The walls may have openings or certain walls may be absent to interconnect the cells. The cell shape may further define a shape of corresponding transducers 210. Open-celled structures may vary in one or more of cell dimension (e.g. length, width, depth, arcs, etc.), cell shape (e.g., square, hexagonal, polygonal, circular, ovoid, amorphous, etc.), and wall thickness. In some embodiments, the cell shape may not repeat, or may vary across different transducers 210. The open-celled structure may also define an actuation resolution for layer 200. For instance, the open-celled structure may define a density, number, magnitude of deformation, etc. of actuated, deformed, and non-actuated transducers 210 which may also relate to a desired surface texture.

Fluid channel 260 may be filled with a fluid, such as a liquid or a gas. The fluid may be incompressible or nearly incompressible such that when a transducer 210 is actuated, the attractive force between electrodes 250 may cause compression of the fluid channel 260 without also compressing the fluid. A volume and/or fluid pressure of the fluid may be consistent across all transducers 210 in unactuated states, although in some embodiments certain transducers 210 may be pre-stressed with an increased volume and/or pressure of fluid.

FIGS. 2A and 2C illustrate actuated transducers 220 and deformed transducers 230. Actuated transducers 220 may include actuated electrodes 252 which have adhered in response to an applied electric potential. The adhesion of actuated electrodes 252 may push the fluid out of fluid channel 260 with respect to actuated transducers 220. Because the fluid may be incompressible, the fluid may flow to fluid channel 260 of one or more neighboring transducers 220, for instance deformed transducer 230. Deformed transducer 230 includes deformed fluid channel 262 which may be deformed as compared to fluid channel 260 of an unactuated transducer 210. Deformed fluid channel 262 may be enlarged due to increased volume and/or fluid pressure resulting from the fluid pushed out of actuated transducers 220. The increased volume and/or fluidic pressure may further cause electrodes 250 and/or substrates 240 for deformed transducer 230 to also deform. Thus, the selective actuation of transducers 210 may allow programmable deformation of layer 200.

FIG. 2C shows the deformation as a bulge. In other embodiments, the deformation may result in different shapes, such as a more defined bump or a depression or other deformation to a smooth, flat surface.

Transducers 210 may also be selectively actuated to produce desired deformations. For example, FIG. 2A illustrates several actuated transducers 220 completely surrounding two deformed transducers 230. Such actuation arrangement may improve deformation of deformed transducers 230, for instance by ensuring that the increased volume/fluidic pressure is trapped within deformed transducers 230 without escaping to adjacent transducers 210.

Although transducers 230 are described herein comprising electrically actuated electrodes 250, in other embodiments the transducers 230 may be actuated in other ways to selectively actuate and deform transducers 230. For instance, in some embodiments a fluidic controller may be coupled to fluid channel 260 and configured to selectively apply fluidic pressure to transducers 210.

FIGS. 3A-3B illustrate a multilayer membrane 300 including two layers 305. Each layer 305 may correspond to layer 200. Each layer 305 may include transducers 310 which may each correspond to transducer 100 and/or transducer 210. Transducers 310 may include substrates 340, electrodes 350, and fluid channels 360. One layer 305 may be positioned on the other layer 305. In some embodiments, layers 305 may share a substrate 340 such that substrate 340 of one layer 305 may be integrated with substrate 340 of the other layer 305, although in other embodiments each layer 305 may have separate substrates 340.

Each layer 305 may include actuated transducers 320 and deformed transducers 330 such that transducers 310 may be actuated and/or deformed for each layer 305 independently from the other layer 305. For example, as illustrated in FIG. 3B, actuated electrodes 352 of actuated nodes 320 of the top layer 305 may cause deformation of deformed fluid channel 362 and deformed transducer 330 without requiring similar actuation in the bottom layer 305. In some embodiments, deformations in transducers 310 of one layer 305 may cause deformations in the other layer 305.

FIGS. 4A-4E illustrate multilayer membrane 400 which may correspond to multilayer membrane 300. Multilayer membrane 400 may include top and bottom layers 405 and 406 of transducers 410 which may each correspond to transducer 100. Transducers 410 may include electrodes 450, substrates 440, and fluid channels 460. Layers 405 may have different open-celled structures from each other which may differ in at least one of cell dimension, cell shape, or wall thickness.

Figure 4A:
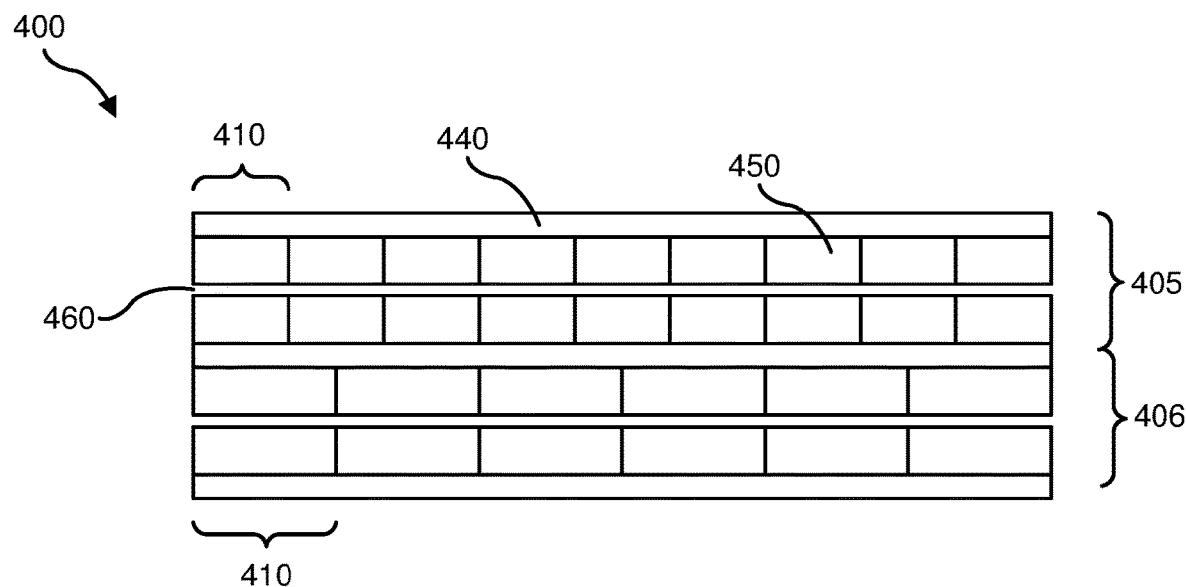

FIG. 4A illustrates multilayer membrane 400 with top layer 405 having a first open-celled structure that may be different from a second open-celled structure of bottom layer 406. Transducers 410 of bottom layer 406 may be larger (e.g., having larger components, cell dimensions, wall thicknesses, and/or shape) than transducers 410 of top layer 405.

Figure 4B:
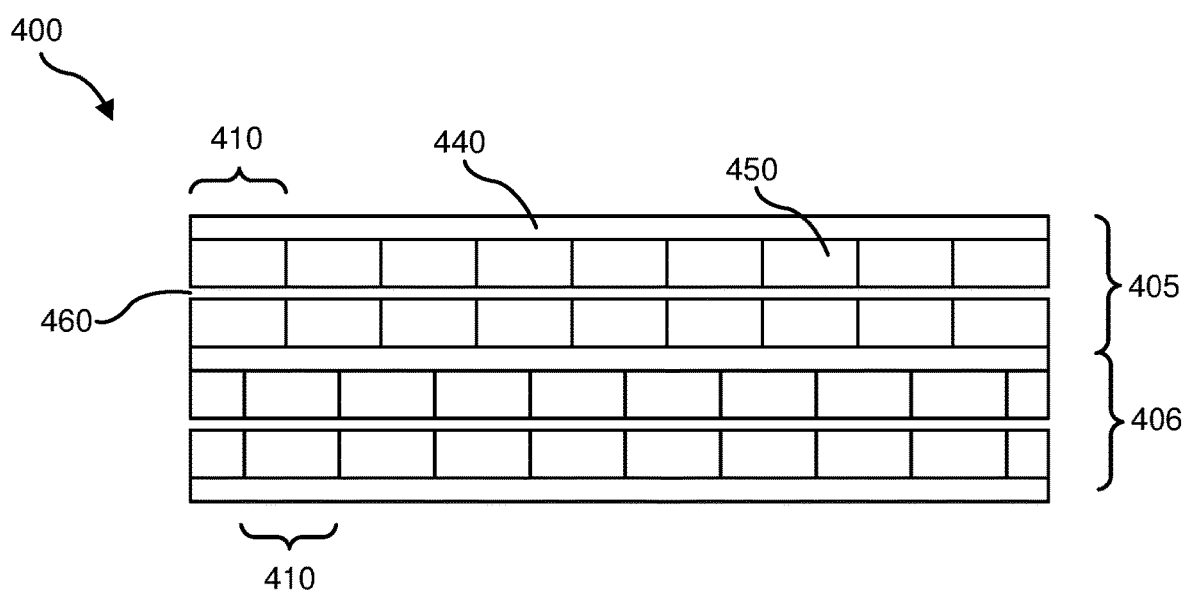

FIG. 4B illustrates top layer 405 and bottom layer 406 having similar open-celled structures. However, the open-celled structures are offset such that the walls of the open-celled structure of top layer 405 may not be aligned with that of bottom layer 406. In other embodiments, the open-celled structures may be different.

Multilayer membrane 400 may be capable of a greater range of actuation resolutions than a single layer, such as layer 200. Top layer 405 may be capable of a first actuation resolution which may correspond to the first open-celled structure. Bottom layer 406 may be capable of a second actuation resolution which may correspond to the second open-celled structure. Multilayer membrane 400 may be capable of a third actuation resolution, for instance through selective simultaneous actuation of top layer 405 and bottom layer 406. The first, second, and third actuation resolutions may differ from each other. As detailed above, electric potentials may be applied to electrodes 450 for actuation. In some embodiments, a fluidic controller may be coupled to one or both fluid channels 460 of top layer 405 and/or bottom layer 406 to selectively apply fluidic pressure to one or more transducers 410 of top layer 405 and/or bottom layer 406.

Figure 4E:
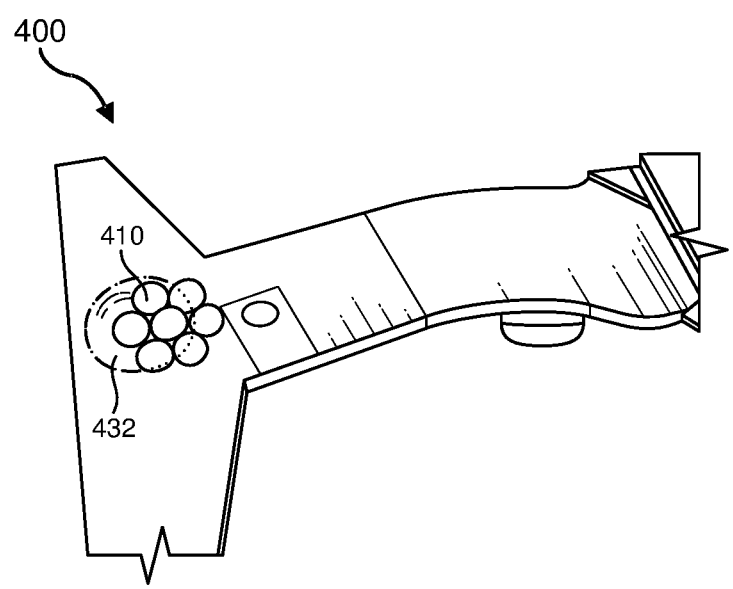

FIGS. 4C-4E illustrate an angled top-down view of sample multilayer membrane 400, at various actuation states. FIG. 4C illustrates multilayer membrane 400 in an unactuated state. As seen in FIG. 4C, multilayer membrane 400 may be generally flat, undeformed, and/or unstressed when no transducers 410 are actuated. Transducers 410 of top layer 405 are visible in FIG. 4C to illustrate the unactuated state of transducers 410.

FIG. 4D illustrates multilayer membrane 400 having one or more transducers 410 of top layer 405 actuated to deform certain transducers 410 (e.g., deformed transducer 430) of top layer 405. As seen in FIG. 4D, deformed transducer 430 of top layer 405 may be seen as a raised bubble. Transducers 410 adjacent to deformed transducer 430 may be actuated to deform deformed transducer 430, although in other embodiments other transducers 410 on the same and/or different layer may be actuated. Deformed transducer 430 may be raised enough such that the raised bubble shape may be felt and recognized by human touch.

FIG. 4E illustrates multilayer membrane 400 having one or more transducers 410 of bottom layer 406 actuated to deform certain transducers 410 (e.g., deformed transducer 432) of bottom layer 406. As seen in FIG. 4E, deformed transducer 432 may be seen as a raised bubble. Deformed transducer 432 of bottom layer 406 may be a different size and/or shape from deformed transducer 430 of top layer 405 due to, for instance, top layer 405 having a different open-cell structure than that of bottom layer 406. Transducers 410 adjacent to deformed transducer 432 may be actuated to deform deformed transducer 432, although in other embodiments other transducers 410 on the same and/or different layer may be actuated. Deformed transducer 432 may deform top layer 405. Deformed transducer 432 may be raised enough (e.g., deformed top layer 405) such that the raised bubble shape may be felt and recognized by human touch. In FIG. 4E, deformed transducer 432 may deform transducer 410 overlying deformed transducer 432. However, as compared to FIG. 4D, the deformation of transducer 410 of top layer 405 by deformed transducer 432 may differ from the direct deformation of transducer 410 (e.g., deformed transducer 430 in FIG. 4D). Moreover, as seen in FIG. 4E, deformations of transducers 410 of bottom layer 406 may be independent from actuations and/or deformations of top layer 405.

Although not shown in the figures, transducers 410 of top layer 405 may be actuated and/or deformed simultaneously with transducers 410 of bottom layer 406. In certain embodiments, actuation of one or more transducers 410 of one layer may deform transducers 410 of another layer. In addition, in certain embodiments, unactuated, actuated, and/or deformed transducers 410 of one layer may be staggered, offset from, and/or overlap unactuated, actuated, and/or deformed transducers 410 of another layer. In certain embodiments, multiplayer membrane 400 may include more than two layers, such that transducers 410 of one layer may deform or otherwise interact with transducers 410 of a non-adjacent layer. In certain embodiments, actuation and/or deformation of transducers 410 across different layers may produce different deformation pattern and/or structures than capable when deforming only a single layer.

At least one of top layer 405 and bottom layer 406 may be configured to provide haptic feedback for an artificial reality system. For example, a desired haptic sensation may be achieved by selective actuation of transducers 410. Multilayer membrane 400 may be integrated in a wearable device to provide haptic feedback to body parts. For instance, multilayer membrane 400 may be incorporated into gloves for the artificial reality system. Actuation of transducers 410 may produce haptic sensations on the fingertips and/or hands of a user wearing the gloves.

In some embodiments, multilayer membrane 400, or one of top or bottom layers 405 and/or 406, may comprise a capacitive pressure sensor. Rather than applying electric potentials to electrodes 450, a distance between electrodes 450 may create a measurable change in electric potential. For instance, if a pair of electrodes 450 touch (e.g., as a result of user touch or pressure) the resulting change in electric potential may be detected to register a touch.

FIGS. 5A-5C illustrate how a layer 500, which may correspond to layer 200, may be fabricated. Layer 500 may include a substrate 540, electrode 550, contact 555. FIGS. 5A-5C further illustrate a fluid hose 520 and bonded portion 545. FIGS. 5A-5C will be discussed with respect to FIG. 6.

FIG. 6 is a flow diagram of an exemplary fabrication method 600 for fabricating layers of a multilayer membrane such as layer 500, layer 200, layer 305, top layer 405, and/or bottom layer 406 as described herein.

As illustrated in FIG. 6, at step 610 a first conductive layer may be formed on a first substrate. Step 610 may be performed in a variety of ways. In one example, the first substrate may be doped to form the first conductive layer.

The first substrate may be an elastomer or TPU substrate or made of another non-rigid material. The first conductive layer may include carbon nanotubes (CNT) and/or carbon doped silicone. The first conductive layer may be deposited on the first substrate using any suitable deposition process, such as physical vapor deposition (PVD), chemical vapor deposition (CVD), thin-film deposition, ion plating, ion beam-assisted deposition, etc. Alternatively to or in addition to deposition, the first substrate may be doped to form the first conductive layer.

At step 620 one or more of the systems described herein may form a second conductive layer on a second substrate. The second substrate and the second conductive layer may comprise the same or similar materials as the first substrate and the first conductive layer, although in other embodiments different materials with similar properties may be used. Similar to step 610, the second conductive layer may be formed on the second substrate by deposition, doping, or a combination thereof.

FIGS. 5A-5C illustrate electrode 550 formed on substrate 540. Electrode 550 may be formed into a specific desired shape, for instance based on a desired open-celled structure. Forming the conductive layers may further include forming contact 555. Contact 555 may be an electrically conductive conduct for coupling to electrode 550. The placement of contact 555 may depend on the open-celled structure. For example, contact 555 may extend from a sidewall of substrate 540 (e.g. FIG. 5A) and/or may extend out of a top surface of substrate 540 (e.g. FIG. 5B).

Returning to FIG. 6, at step 630 one or more of the systems described herein may at least partially bond the first substrate to the second substrate to form a first layer of fluidic transducers. The unbonded portions of the first substrate and the second substrate may define a first fluid channel between the first conductive layer and the second conductive layer. The substrates may be bonded with the first conductive layer facing the second conductive layer such that the conductive layers are sandwiched between the substrates.

Step 630 may be performed in a variety of ways. The first substrate may be bonded to the second substrate using an adhesive, application of heat and/or pressure, or some combination thereof. In addition, the bonded portions may be bonded based on the desired open-celled structure. For example, FIG. 5B shows bonded portion 545 outlining a rectangular shape. As seen in FIG. 5C, bonded portion 545 may form walls of a transducer and may correspond to walls of the desired open-celled structure.

As illustrated in FIG. 6, at step 640 one or more of the systems described herein may insert a first fluid in the first fluid channel between the first conductive layer and the second conductive layer.

Step 640 may be performed in a variety of ways. In one example, as illustrated in FIGS. 5B and 5C, fluid hose 520 may be inserted between two substrates 540 and more specifically into a void 560 between two paired electrodes 550. Void 560 may be thin, such as thinner than a thickness of substrate 540. Void 560 between electrodes 550 may be filled with a fluid such as air or water using fluid hose 520 to form a fluid channel similar to fluid channel 260, 360, and/or 460.

In some embodiments, steps 630 and 640 may be performed in a different order or simultaneously. For instance, void 560 may be filled with fluid before or concurrently with bonding substrates 540.

As illustrated in FIG. 6, at step 650 one or more of the systems described herein may form a third conductive layer on a third substrate. Step 650 in a variety of ways. For example, the third conductive layer may be deposited onto and/or doped into the third substrate. At step 660 one or more of the systems described herein may form a fourth conductive layer on a fourth substrate. Step 660 may be performed in a variety of ways. For example, the fourth conductive layer may be deposited onto and/or doped into the fourth substrate. The third and/or fourth substrates may be made of a non-rigid material, similar to the first and/or second substrates. The third and/or fourth conductive layers may be made of electrically conductive materials, similar to the first and/or second conductive layers.

At step 670 one or more of the systems described herein may at least partially bond the third substrate to the fourth substrate to form a second layer of fluidic transducers. The unbonded portions of the third substrate and the fourth substrate may define a second fluid channel between the third conductive layer and the fourth conductive layer. Step 670 may be performed in a variety of ways. For example, an adhesive, heat and/or pressure may be used to bond the third and fourth substrates. At step 680 one or more of the systems described herein may insert a second fluid in the second fluid channel between the third conductive layer and the fourth conductive layer. Step 680 may be performed in a variety of ways. For example, an air hose or fluid hose may be inserted between the third and fourth conductive layers to insert the second fluid. Steps 670 and 680 may be performed concurrently or in a reverse order, similar to steps 630 and 640 described above.

Steps 610-640 may correspond to forming a first layer (e.g. bottom layer 406) of a multilayer membrane (e.g. multilayer membrane 400). Steps 650-680 may correspond to forming a second layer (e.g. top layer 405) of the multilayer membrane. The steps of method 600 may be performed in any order to produce the first and second layers. In some embodiments, the second and third substrates may be the same layer or otherwise integrated. In such embodiments the second and third conductive layers may be formed on opposite surfaces of the second substrate.

The first and second layers may be combined to form a multilayer membrane. For instance, the second layer of fluidic transducers may be positioned on the first layer of fluidic transducers. The multilayer membrane may then be integrated into a device. The multilayer membrane may be part of a wearable haptic device. For example, the surface of a wearable device may be formed using at least one of the first and second layers of fluidic transducers.

In some embodiments, the layers of fluidic transducers may be pre-strained. Fluidic pressure may be applied, using the first or second fluid, to one or more transducers of the first and second layers of fluidic transducers. A fluidic controller may be coupled to the fluid channels of the first and/or second layers to apply and/or relieve fluidic pressure.

FIG. 7 is a flow diagram of an exemplary method 700 of using a multilayer membrane such as layer 500, layer 200, layer 305, top layer 405, and/or bottom layer 406 as described herein.

As illustrated in FIG. 7, at step 710 one or more of the systems described herein may apply an electric potential to at least one transducer of a first layer of fluidic transducers or a second layer of fluidic transducers of a device to produce a target actuation resolution.

Each transducer in the first layer of fluidic transducers may comprise a first electrode coupled to a first substrate of the first layer, a second electrode coupled to a second substrate of the first layer, and a fluid channel between the first and second electrodes of the first layer of electrodes.

Each transducer in the second layer of fluidic transducers may comprise a first electrode coupled to a first substrate of the second layer, a second electrode coupled to a second substrate of the second layer, and a fluid channel between the first and second electrodes of the second layer. The second layer of fluidic transducers is positioned on the first layer of fluidic transducers.

The systems described herein may perform step 710 in a variety of ways. A controller and power source may be coupled to the fluidic transducers to selectively actuation certain transducers. In one example, a processor (e.g., a processor 1160 in FIG. 11) may be coupled to multilayer membrane 300. The processor may be running software that may produce haptic feedback outputs. The processor may determine a target actuation for producing the desired haptic feedback and accordingly actuation specific transducers 310 to achieve the target actuation.

In some examples, the multilayer membrane may comprise a haptic device for an artificial reality system and applying the electric potential may further comprise additional optional steps. FIGS. 8-13, further described below, illustrate exemplary artificial reality systems for haptic feedback applications. As illustrated in FIG. 7, at step 711 one or more of the systems described herein may determine the target actuation resolution based on haptic feedback for the artificial reality system, the target actuation resolution comprising a first actuation resolution for the first layer of fluidic transducers and a second actuation resolution for the second layer of fluidic transducers.

The systems described herein may perform step 711 in a variety of ways. In one example, the processor may determine, for instance, which transducers 310 of the layers 305 to deform for the first and second actuation resolutions and which transducers 310 to actuate for the desired deformations.

At step 712 one or more of the systems described herein may determine, based at least on the first actuation resolution, a first electric potential to be applied to the first layer of fluidic transducers. The systems described herein may perform step 712 in a variety of ways. For example, the processor may determine which transducers 310 of the top layer 305 to actuate, and a first magnitude of electric potential to actuate the desired transducers 310. In some embodiments, the magnitude of the electric potential may control a magnitude of deformation. The electric potential may be provided by a power source (e.g., power source 1150 in FIG. 11).

At step 713 one or more of the systems described herein may determine, based at least on the second actuation resolution, a second electric potential to be applied to the second layer of fluidic transducers. The systems described herein may perform step 713 in a variety of ways. For example, the processor may determine which transducers 310 of the bottom layer 305 to actuate, and a second magnitude of electric potential to actuate the desired transducers 310. The second electric potential may be provided by a power source (e.g., power source 1150 in FIG. 11) which may be the same or different power source as that of the first electric potential.

At step 714 one or more of the systems described herein may actuate a first transducer of the first layer of fluidic transducers by applying the first electric potential to the first and second electrodes of the first transducer.

The systems described herein may perform step 714 in a variety of ways. In one example, the processor may apply the determined first electric potential to the top layer 305 to actuate actuated transducers 320 of the top layer 305. Actuating actuated transducers 320 may generate a first attractive force between electrodes 352, compresses fluid channel 360 between electrodes 352 and causes the fluid in fluid channel 360 to deform unactuated deformed transducer 330 to produces the first actuation resolution. In some embodiments, deforming unactuated transducers may include inflating or straining the substrate of the unactuated transducer using the first fluid.

As illustrated in FIG. 7, at step 715 one or more of the systems described herein may actuate a second transducer of the second layer of fluidic transducers by applying the second electric potential to the second transducer.

The systems described herein may perform step 715 in a variety of ways. In one example, the processor may apply the determined second electric potential to actuate actuated transducers 320 of the bottom layer 305 in order to deform deformed transducer 330. Actuating the second transducer may generate a second attractive force between the first and second electrodes of the actuated second transducer, compress the fluid channel between the first and second electrodes of the second transducer, cause a second fluid in the fluid channel to deform an unactuated transducer of the second layer of fluidic transducers, and produce the second actuation resolution. In some embodiments, deforming the unactuated transducer of the first or second layer of fluidic transducers may comprise inflating or straining a substrate of the unactuated transducer using the first or second fluid.

In some embodiments, the fluidic transducers may be preloaded. The transducers of the first or second layer of fluidic transducers may be preloaded by selectively applying fluidic pressure, using the first or second fluid, to one or more transducers. For example, a fluidic controller coupled to fluid channels 360 may preload certain transducers 310. Alternatively, the fluidic transducers may be preloaded by a vacuum applied to the fluid channels, which may reduce pressure. In certain embodiments, the transducers may be preloaded by material, for instance due to a device design, or a user, for instance due to the user's fingers naturally pressing against the multilayer membrane.

In some embodiments, the target actuation resolution may correspond to a vibration intensity. The controller may determine a pulse frequency corresponding to the target actuation resolution. The controller may, using a fluidic controller, apply fluid pressure to unactuated transducers of the first or second layer of fluidic transducers. The controller may pulse actuation of the transducers of the first or second layers based on the pulse frequency. The pulsing actuation of the nodes may produce the desired vibration intensity.

According to the aspects described herein, a haptic device may include a multilayer membrane. The multilayer membrane may be a fluidically powered bubble array in which fluidic pressure may be used to deform the bubbles. Fluidic transducers in the membrane may control fluid flow to selectively deform the membrane. Such bubble arrays may be desirable because of the power density available using fluidic pressure. Each layer may provide an additional channel of actuation which may provide an additional transmission line for producing a greater range of haptic feedback. In addition, the multilayer design may reduce the added bulk material needed for separating layers between discrete bladders. Thus, using the multilayer membrane, wearable haptic devices such as gloves may be fabricated.

In other examples, the multilayer membrane may be used for controlling fluid flow to other components. For instance, the fluidic transducers may act as valves by redirecting and/or restricting fluid flow to certain valves or devices. The fluidic transducers may alternatively create multiple arbitrary flow paths in the membrane to/from other valves or devices.

Embodiments of the instant disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 800 in FIG. 8. Other artificial reality systems may include a NED that also provides visibility into the real world (e.g., augmented-reality system 900 in FIG. 9) or that visually immerses a user in an artificial reality (e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 8, augmented-reality system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. Augmented-reality system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, augmented-reality system 800 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 800 may not include a NED, augmented-reality system 800 may include other types of screens or visual feedback devices (e.g., a display screen integrated into a side of frame 802).

The embodiments discussed in this disclosure may also be implemented in augmented-reality systems that include one or more NEDs. For example, as shown in FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in Augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may include a position sensor, an inertial measurement unit (IMU), a depth camera assembly, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

Augmented-reality system 900 may also include a microphone array with a plurality of acoustic transducers 920(A)-920(J), referred to collectively as acoustic transducers 920. Acoustic transducers 920 may be transducers that detect air pressure variations induced by sound waves. Each acoustic transducer 920 may be configured to detect sound and convert the detected sound into an electronic format (e.g., an analog or digital format). The microphone array in FIG. 2 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by the controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer, or some combination thereof.

Acoustic transducers 920(A) and 920(B) may be positioned on different parts of the user's ear, such as behind the pinna or within the auricle or fossa. Or, there may be additional acoustic transducers on or surrounding the ear in addition to acoustic transducers 920 inside the ear canal. Having an acoustic transducer positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments, acoustic transducers 920(A) and 920(B) may be connected to augmented-reality system 900 via a wireless connection (e.g., a Bluetooth connection). In still other embodiments, acoustic transducers 920(A) and 920(B) may not be used at all in conjunction with augmented-reality system 900.

Acoustic transducers 920 on frame 910 may be positioned along the length of the temples, across the bridge, above or below display devices 915(A) and 915(B), or some combination thereof. Acoustic transducers 920 may be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

Augmented-reality system 900 may further include or be connected to an external device (e.g., a paired device), such as neckband 905. As shown, neckband 905 may be coupled to eyewear device 902 via one or more connectors. The connectors may be wired or wireless connectors and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof. Furthermore, neckband 905 generally represents any type or form of paired device. Thus, the following discussion of neckband 905 may also apply to various other paired devices, such as smart watches, smart phones, wrist bands, other wearable devices, hand-held controllers, tablet computers, laptop computers, etc.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 905 may be communicatively coupled with eyewear device 902 and/or to other devices. The other devices may provide certain functions (e.g., tracking, localizing, depth mapping, processing, storage, etc.) to augmented-reality system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on 905 and/or augmented-reality system 900. For example, controller 925 may process information from the microphone array that describes sounds detected by the microphone array. For each detected sound, controller 925 may perform a DoA estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1000 and/or virtual-reality system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 800, Augmented-reality system 900, and/or virtual-reality system 1000 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

While not shown in FIGS. 8-10, artificial reality systems may include tactile or haptic feedback systems. By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 800, 900, and 1000 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. Textile material 1130 may include one or more of layer 200, layer 300, and layer 400 as described herein. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned to be against the user's finger(s), thumb, or wrist, as shown in FIG. 11. Vibrotactile devices 1140 may, in some examples, be sufficiently flexible to conform to or bend with the user's corresponding body part(s). Vibrotactile device 1140 may comprise one or more of layer 200, layer 300, and layer 400 as described herein.

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, Bluetooth, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Haptic wearables, such as those shown in and described in connection with FIG. 4, may be implemented in a variety of types of artificial-reality systems and environments. FIG. 12 shows an example artificial reality environment 1200 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1202 generally represents any type or form of virtual-reality system, such as virtual-reality system 1000 in FIG. 3. Haptic device 1204 generally represents any type or form of wearable device, worn by a use of an artificial reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

While haptic interfaces may be used with virtual-reality systems, as shown in FIG. 5, haptic interfaces may also be used with augmented-reality systems, as shown in FIG. 6. FIG. 13 is a perspective view of a user 1310 interacting with an augmented-reality system 1300. In this example, user 1310 may wear a pair of augmented-reality glasses 1320 that have one or more displays 1322 and that are paired with a haptic device 1330. Haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer to as sensor and/or feedback mechanisms. For example, haptic devices 1110, 1120, 1204, and 1330 may include one or more mechanical transducers, piezoelectric transducers, and/or fludic transducers such as one or more of layer 200, layer 300, and layer 400 as described herein. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to determine haptic feedback, use the result of the transformation to actuate transducers. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality, a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   a plurality of deformable fluidic transducers, wherein each transducer comprises:
   a first electrode;
   a second electrode; and
   a fluid channel between the first and second electrodes;
   wherein actuating the transducer includes compressing the fluid channel to deform a neighboring unactuated transducer.

2. The device of claim 1, wherein applying an electric potential to at least one of the first and second electrodes actuates the transducer, and a magnitude of the electric potential controls a magnitude of deformation of the neighboring unactuated transducer.

3. The device of claim 1, wherein the plurality of deformable fluidic transducers comprises a first layer of deformable fluidic transducers and a second layer of deformable fluidic transducers.

4. The device of claim 3, wherein the second layer of fluidic transducers is positioned on the first layer of fluidic transducers such that deformation of transducers of the first layer of fluidic transducers causes deformation of the second layer of fluidic transducers by deforming transducers of the second layer of fluidic transducers overlying the deformed transducers of the first layer.

5. The device of claim 3, wherein the first layer of fluidic transducers comprises a first open-celled structure defining a shape of the transducers of the first layer and the second layer of fluidic transducers comprises a second open-celled structure defining a shape of the transducers of the second layer.

6. The device of claim 5, wherein the first open-celled structure differs from the second open-celled structure in at least one of cell dimension, cell shape, or wall thickness.

7. The device of claim 5, wherein the first open-celled structure is offset from the second open-celled structure such that walls of the first open-celled structure are not aligned with walls of the second open-celled structure.

8. The device of claim 3, wherein the first layer of fluidic transducers is capable of a first actuation resolution, the second layer of fluidic transducers is capable of a second actuation resolution different from the first actuation resolution, and simultaneous actuation of the first and second layers of fluidic transducers produces a third actuation resolution.

9. The device of claim 3, wherein a first substrate of the first layer of fluidic transducers is integrated with a second substrate of the second layer of fluidic transducers.

10. The device of claim 1, further comprising a fluidic controller coupled to the fluid channels of the plurality of deformable fluidic transducers and configured to selectively apply fluidic pressure to one or more transducers of the plurality of deformable fluidic transducers.

11. The device of claim 1, wherein the plurality of fluidic transducers comprises a capacitive pressure sensor.

12. A method comprising:
forming a first conductive layer on a first substrate;
forming a second conductive layer on a second substrate;
at least partially bonding the first substrate to the second substrate to form a layer of deformable fluidic transducers, wherein unbonded portions of the first substrate and the second substrate define a fluid channel between the first conductive layer and the second conductive layer, and the fluid channel has an open-celled structure; and
inserting a fluid in the fluid channel between the first conductive layer and the second conductive layer, wherein the open-celled structure allows the fluid to flow from an actuated fluidic transducer and deform a neighboring unactuated fluidic transducer.

13. The method of claim 12, further comprising:
forming a third conductive layer on a third substrate;
forming a fourth conductive layer on a fourth substrate;
at least partially bonding the third substrate to the fourth substrate to form a second layer of deformable fluidic transducers, wherein unbonded portions of the third substrate and the fourth substrate define a second fluid channel between the third conductive layer and the fourth conductive layer and wherein the second layer of fluidic transducers is positioned on the layer of fluidic transducers; and
inserting a second fluid in the second fluid channel between the third conductive layer and the fourth conductive layer.

14. The method of claim 12, further comprising selectively applying fluidic pressure, using the fluid, to one or more transducers of the layer of fluidic transducers.

15. The method of claim 12, further comprising forming a surface of a wearable device using the layer of fluidic transducers.

16. A method comprising:
applying an electric potential to at least one transducer of a layer of deformable fluidic transducers to produce a target actuation resolution;
wherein each transducer in the layer of fluidic transducers comprises a first electrode coupled to a first substrate of the layer, a second electrode coupled to a second substrate of the layer, and a fluid channel between the first and second electrodes of the layer of fluidic transducers; and
wherein actuating a fluidic transducer deforms a neighboring unactuated transducer.

17. The method of claim 16, wherein deforming the unactuated transducer comprises inflating or straining a substrate of the unactuated transducer using the fluid.

18. The method of claim 16, further comprising preloading the transducers of the layer of fluidic transducers by selectively applying fluidic pressure, using the fluid, to one or more transducers.

19. The method of claim 16, further comprising:
determining a pulse frequency corresponding to the target actuation resolution, wherein the target actuation resolution corresponds to a vibration intensity;
applying fluid pressure to unactuated transducers of the layer of fluidic transducers; and
pulsing actuation of the transducers based on the pulse frequency, wherein the pulsing actuation of the transducers produces the vibration intensity.

20. The method of claim 16, wherein applying the electric potential further comprises:
determining the target actuation resolution based on haptic feedback for an artificial reality system, the target actuation resolution comprising a first actuation resolution for the layer of fluidic transducers and a second actuation resolution for a second layer of fluidic transducers positioned on the layer of fluidic transducers;
determining, based at least on the first actuation resolution, a first electric potential to be applied to the layer of fluidic transducers;
determining, based at least on the second actuation resolution, a second electric potential to be applied to the second layer of fluidic transducers;
producing the first actuation resolution by applying the first electric potential to the layer of fluidic transducers; and
producing the second actuation resolution by applying the second electric potential to the second layer of fluidic transducers.

* * * * *